Figures 1, 2, 3:
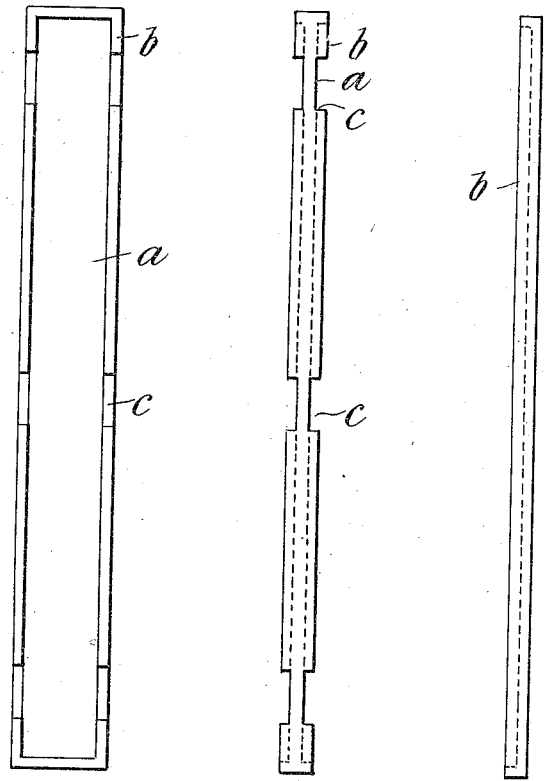

F. W. HARDY & E. H. HUNGERBÜHLER.
SEPARATOR FOR SECONDARY BATTERIES.
APPLICATION FILED MAR. 13, 1912.

1,200,345.

Patented Oct. 3, 1916

UNITED STATES PATENT OFFICE.

FREDERICK WYER HARDY AND EMIL HENRY HUNGERBÜHLER, OF SALTBURN, ENGLAND.

SEPARATOR FOR SECONDARY BATTERIES.

1,200,345.    Specification of Letters Patent.    Patented Oct. 3, 1916.

Application filed March 13, 1912. Serial No. 683,647.

*To all whom it may concern:*

Be it known that we, FREDERICK WYER HARDY, a subject of the King of Great Britain, residing at the Hollies, Saltburn, in the county of York, England, and EMIL HENRY HUNGERBÜHLER, a citizen of the Republic of Switzerland, residing at 7 Lune street, Saltburn, in the county of York, England, have invented new and useful Improvements in Separators for Secondary Batteries, of which the following is a specification.

In secondary batteries it is very usual to have separators between the adjacent electrodes to keep the plates apart and particularly to prevent short circuiting through falling out of active material. Such separators have hitherto been made of cellulose or the like, or of wood, or of earthenware, and kaolin has also been suggested. It is in all cases desirable that these separators shall be readily permeable by the electrolyte so that the internal resistance of the cell is not considerably increased by their presence; but where the separators occupy the whole space between the plates their properties in this regard become vastly more important. The effective part of the electrolyte is contained within their interstices, and therefore they must be capable of containing a sufficient amount of liquid. It is useless to actually perforate the separators for then not only is it possible for short-circuiting to take place through the orifice, but the active material is left in part without support; this latter is also the case if the separators are provided with corrugations or channels. Now it is one of the chief advantages of separators occupying the whole space between the electrodes that they can serve to keep the active material in position so that there is no need to devise special constructions of plate to this end. Hence it is necessary to find a material which while inactive electrically and chemically and not liable to deterioration, shall be thoroughly porous and yet present a continuous supporting surface to contact with the electrodes. The most convenient construction of cell is one in which the active material is spread over the whole of the opposing surfaces of the electrodes and is kept in position by thin separators which each touch the whole of the surface of the two plates they support and are as thin as they can be conveniently manufactured.

The present invention consists in an improved method of manufacturing such separators by which porous plates of uniform thickness are obtained having great capillary capacity and sufficient mechanical strength and as thin as $\frac{1}{16}$ of an inch.

According to the invention a fine powder is conglomerated first by mechanical pressure and then by heating it sufficiently to give it the necessary strength but not enough to fuse it to an impervious mass. The lower the temperature of the baking and the finer the powder the greater will be the capillary capacity of such separators. The fine powder may be mixed with a small proportion of binding material just enough to give it some additional cohesion and strength during and after baking.

The following are two examples of materials which it is preferred to employ. If the aluminium silicate such as found in the form of China clay, Cornish stone or ball clay, is made use of, a binding or strengthening substance such as ground feldspar, flint, bone or chalk may be used. Or again, if the separator is to be silicic in nature the material employed is powdered sand or some other form of pure silica. In this case a binding material consisting of a small quantity of aluminium silicate in the form of China clay, Cornish stone or ball clay may be used.

A charge of the material or materials to be used is thoroughly mixed with water to a consistency of thick cream in a tank, by means of paddles or stirrers. The charge is stirred for some four to six hours until it attains uniform consistency after which it is put through a sifter or fine wire screen with a mesh of about 100 per inch and then passed into a storage tank in readiness for use. This tank must also have a stirrer to prevent the insoluble constitutents settling down. This mixture is then put into canvas bags or sacks through the canvas of which most of the water is expressed. The moist sticky masses thus produced are removed from the bags and dried in a heated drying room, and the dry material is then broken into small pieces in a crusher. After this it is ground into a fine powder in a dust mill. The fine powder is then put into a press and compressed under a pressure of about one ton per square inch and so formed into cakes or plates of the desired form. After removal from the press the cakes or plates are ready for firing. The cakes or plates are then placed in a saggar or containing vessel of fireproof clay which may be packed with powder such as ground flint or sand. In this vessel the plates are heated in a kiln or oven to some 1200° to 1300° C. the temperature depending upon the quality and thickness of the plates to be burnt. The heating is continued until the plates are baked right through, which generally occurs in thirty to forty hours according to the efficiency of the kiln or oven.

Alternative constructions of plate are illustrated in the accompanying drawing, in which—

Figure 1 is a face view, and Fig. 2 an edge view of one construction, while Fig. 3 is an edge view of an alternative construction.

As may be seen from these figures, the main body of the separator is a thin plate $a$ so thin as to be more or less flexible. This may be provided with a border or flange $b$ which may be on both sides as indicated in Fig. 2 or on one side only as indicated in Fig. 3. These flanges may actually inclose the active material or they may simply abut against the edges of the electrode. They may be continuous as shown in Fig. 3 or interrupted as at $c$ in Fig. 2 to allow ready access of electrolyte to the active material. Or flanged and unflanged separators may be used alternatively in a cell.

What we claim is:—

1. A separator for secondary batteries in the form of a thin plate composed of a mixture of baked, compressed, dry-powdered aluminum silicate and powdered silica.

2. A separator for secondary batteries in the form of a thin plate composed of baked, compressed, dry-powdered aluminum silicate and powdered silica, and having a marginal flange.

In testimony whereof we have signed our names to this specification in the presence of the two subscribing witnesses.

FREDERICK WYER HARDY.
EMIL HENRY HUNGERBÜHLER.

Witnesses:
HETHERINGTON NIXON,
FREDERICK H. DUKE.